US010860704B1

(12) United States Patent
Edwards et al.

(10) Patent No.: US 10,860,704 B1
(45) Date of Patent: Dec. 8, 2020

(54) CAPTURING AND SENDING ONE-TIME PASSWORDS USING AUGMENTED REALITY GLASSES

(71) Applicant: Capital One Services, LLC, McLean, VA (US)

(72) Inventors: Joshua Edwards, Philadelphia, PA (US); Andrea Montealegre, Arlington, VA (US); Gaurang Bhatt, Herndon, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/684,743

(22) Filed: Nov. 15, 2019

(51) Int. Cl.
| | |
|---|---|
| *H04L 29/06* | (2006.01) |
| *G06F 21/34* | (2013.01) |
| *G06F 21/44* | (2013.01) |
| *G06K 9/00* | (2006.01) |
| *G06F 40/205* | (2020.01) |
| *G02B 27/01* | (2006.01) |

(52) U.S. Cl.
CPC .............. *G06F 21/34* (2013.01); *G06F 21/44* (2013.01); *G06F 40/205* (2020.01); *G06K 9/00671* (2013.01); *G02B 27/0172* (2013.01); *G02B 2027/014* (2013.01); *G02B 2027/0138* (2013.01); *G02B 2027/0178* (2013.01); *G06F 2221/2111* (2013.01); *G06K 2209/01* (2013.01)

(58) Field of Classification Search
CPC ....... G06L 21/34; G06L 40/205; G06L 21/44; G06K 2209/01; G02B 2027/0138
USPC ............................................................ 726/7
See application file for complete search history.

(56) References Cited

U.S. PATENT DOCUMENTS

| | | | | |
|---|---|---|---|---|
| 2013/0278631 | A1* | 10/2013 | Border | G06F 3/04842 345/633 |
| 2014/0337634 | A1* | 11/2014 | Starner | G06F 3/013 713/186 |
| 2015/0365235 | A1* | 12/2015 | Hostyn | H04L 9/3215 713/184 |

* cited by examiner

*Primary Examiner* — Evans Desrosiers
(74) *Attorney, Agent, or Firm* — Banner & Witcoff, Ltd.

(57) ABSTRACT

A user may view a device with augmented reality glasses which may have a camera that views and collects data on the screen of the user device. When the user desires to access an account for which multifactor authentication is required, a one-time password may be sent to the user. The glasses may recognize the one-time password and determine if the one-time password originated from the user device. If the glasses verify that the one-time password originated from the user based on context of the user device display or the geographic locations of the devices, then the glasses will send the password to the service associated with the one-time password. The glasses may send the password back to the user device, send it to an intermediate server, or send it directly to the server associated with the service that provided the one-time password.

19 Claims, 6 Drawing Sheets

US 10,860,704 B1

CAPTURING AND SENDING ONE-TIME PASSWORDS USING AUGMENTED REALITY GLASSES

FIELD OF USE

Aspects of the disclosure relate generally to authentication, and, more specifically, to using one-time passwords for authentication.

BACKGROUND

Cybercrime is becoming more prevalent and old security methods and systems are becoming outdated and outmatched. A simple password may not be enough to keep hackers and other criminals from gaining access to accounts and confidential information. To help combat the rise of unauthorized access to user accounts, users may opt to use multifactor authentication to gain access to their accounts. Multifactor authentication may provide an additional layer of security to make it more difficult for unauthorized individuals to gain access to a secure system. Typically, multifactor authentication may require that a user enter their username and password and then provide additional information, such as a one-time password, one-time code, and/or a one-time passphrase. The one-time password may be provided via text message, email, a push notification (e.g., from a third-party application), and/or a phone call. For security purposes, one-time passwords may be long sequences of pseudorandom numbers and/or letters that a user enters manually. However, manually entering the one-time password can be cumbersome. For example, the user may mistype the one-time password due to it being cumbersome. Additionally or alternatively, the one-time password may be difficult to remember, which may prompt the user to switch between applications and/or to copy-and-paste the one-time password into an authentication field. Switching between applications and copying-and-pasting the one-time password may present security risks that may be exploited by malicious users.

Aspects described herein may address these and other issues. In particular, aspects described herein may improve the efficiency, speed, and security with which users enter one-time passwords.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects disclosed herein may describe systems and methods that use a one-time password as part of multifactor authentication. In particular, an augmented reality viewing device may authenticate a user via a first authentication process. The augmented reality viewing device may then capture first visual content displayed by a user device and detect a one-time password based on the first visual content. Detecting the one-time password may include recognizing text using optical character recognition, using a regular expression on the recognized text, and/or using natural language processing on the recognized text. The one-time password may be associated with a second authentication process (e.g., multifactor authentication) that corresponds to a request to access a service. The augmented reality viewing device may then determine the service associated with the one-time password based on a visual context of the first visual content. The visual context may include at least part of a text message received on the user device, at least part of a push notification containing the one-time password, at least part of a phone number, and/or at least part of a website address. The augmented reality viewing device may then determine the service associated with the one-time password by capturing second visual content displayed by the user device. The augmented reality viewing device may then identify a website and/or a phone number based on the second visual content. Alternatively, the augmented reality device may determine the service associated with the one-time password based on information received via wireless communications from an application on the user device associated with the service.

The augmented reality viewing device may confirm that the user initiated the request to access the service. In some instances, confirming whether the user initiated the request to access the service may include generating a prompt that requests that the user confirm that the one-time password is for the service, and receiving an acknowledgement from the user. In other instances, the augmented reality viewing device may confirm that the user initiated the request to access the service based on a determination that the user viewed the service based on the first visual content. The augmented reality viewing device may confirm that the user initiated the request to access the service by capturing second visual content displayed by the user device at a second time and determining that the user viewed the service based on the second visual content. The second time may be different from a first time at which the first visual content was captured by the augmented reality viewing device. The augmented reality viewing device may also confirm that the user initiated the request to access the service by determining whether a geographic location of the augmented reality viewing device is within a predetermined distance (e.g. threshold) of a geographic location of the user device.

After the authentication of the user by the first authentication process and the confirmation that the user initiated the request to access the service, the augmented reality viewing device may provide the one-time password to the service. The augmented reality viewing device may provide the one-time password to the service by sending the one-time password to the user device. Alternatively, the augmented reality viewing device may bypass the user device and send the one-time password directly to the service.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
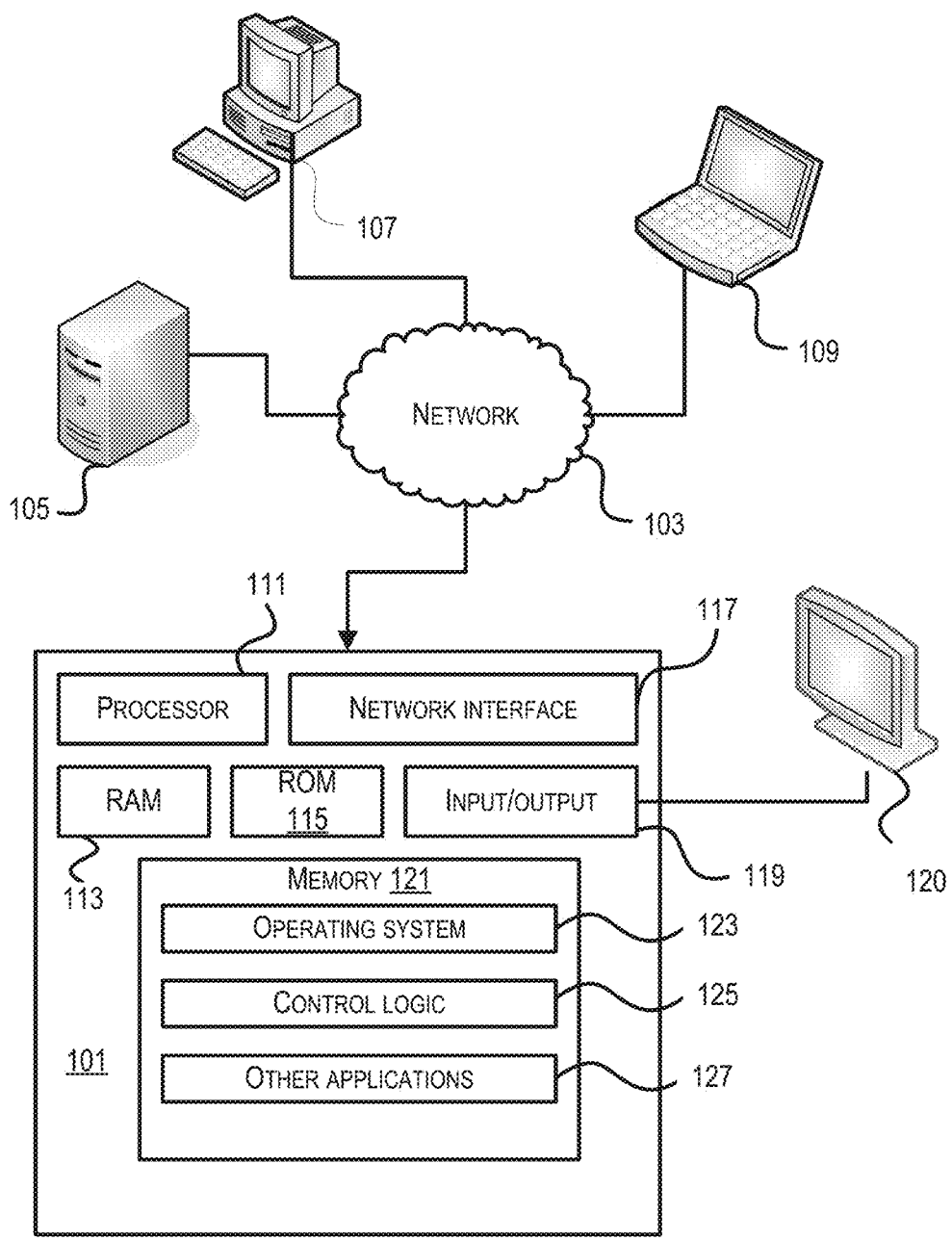
FIG. 1 shows an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may describe methods and techniques for performing multifactor authentication using augmented reality viewing devices. In particular, the methods and techniques described herein overcome the shortcomings associated with having to manually enter a one-time password as part of a multifactor authentication process. As used herein, a one-time password may be any string of characters that are valid for a single login session and/or a single transaction. One-time password may be used interchangeably with one-time code, one-time passphrase, dynamic password, or any equivalent thereof.

A user may wear an augmented reality viewing device while working on a computing device. The augmented reality viewing device may include a camera that collects and analyzes data displayed on the screen of the computing device. The user may wish to access an account, an application, a service, or a resource for which multifactor authentication is required. As part of the multifactor authentication, a one-time password may be sent to a device associated with the user (e.g., after the user provided a username and password). For example, the one-time password may be sent to a mobile device (e.g., cell phone, smart phone, etc.) or tablet. Alternatively, the one-time password may be sent to a smart device (e.g., smart TV) co-located with the user's computing device. The augmented reality viewing device may recognize the one-time password and determine if the one-time password originated from the user's actions on the computing device. If the augmented reality viewing device verifies and confirms that the one-time password originated from the computing device based on a context of the display of the computing device or the geographic locations of the computing device and the device associated with the user, then the augmented reality viewing device may obtain (e.g., retrieve) and send the one-time password to the account, application, service, or resource. Alternatively, or additionally, the augmented reality viewing device may send the one-time password to the computing device, an intermediate server, or to a server associated with the account, application, service, or resource. By having the augmented reality viewing device obtain the one-time password from a device associated with a user and provide the one-time password to either the computing device, an intermediary, or a server, multifactor authentication using a one-time password may occur more efficiently and more securely.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), smart glasses, augmented reality glasses, and/or any other type of data processing device. Computing device 101 may be an augmented reality viewing device. An augmented reality viewing device may be a wearable device, such as augmented reality glasses (e.g., Google Glass, Microsoft HoloLens, Magic Leap One, etc.), augmented reality goggles, etc. Alternatively, augmented reality viewing device may include a device with a camera and display, such as a mobile device, a tablet, a laptop, or the like.

Computing device 101 may, in some embodiments, operate in a standalone environment. In other embodiments, computing device 101 may operate in a networked environment. As shown in FIG. 1, various network nodes 101, 105, 107, and 109 may be interconnected via a network 103, such as the Internet. Other networks may also, or alternatively, be used, including private intranets, corporate networks, LANs, wireless networks, personal networks (PAN), and the like. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media. It will be appreciated that network 103 is for illustration purposes and may be replaced with fewer or additional computer networks.

Computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units. Processor 111 may also include a single central processing unit (CPU), which may be a single-core or multi-core processor, or may include multiple CPUs. Processor(s) 111 and associated components may allow the computing device 101 to execute a series of computer-readable instructions to perform some or all of the processes described herein. Although not shown in FIG. 1, various elements within memory 121 or other components in computing device 101, may include one or more caches, for example, CPU caches used by the processor 111, page caches used by the operating system 123, disk caches of a hard drive, and/or database caches used to cache content from a database. For embodiments including a CPU cache, the CPU cache may be used by one or more processors 111 to reduce memory latency and access time. A processor 111 may retrieve data from or write data to the CPU cache rather than reading/writing to memory 121, which may improve the speed of these operations. In some examples, a database cache may be created in which certain data from the database is cached in a separate smaller database in a memory separate from the database, such as in RAM 113 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Input/output (I/O) device 119 may include a microphone, keypad, touch screen, and/or stylus through which a user of the computing device 101 may provide input, and may also include one or more of a speaker for providing audio output and a video display device for providing textual, audiovisual, and/or graphical output. In some embodiments, I/O device 119 may include an image capture device, such as a camera. Software may be stored within memory 121 to provide instructions to processor 111 that allow computing device 101 to perform various actions. For example, memory 121 may store software used by the computing device 101, such as an operating system 123, control logic 125, and/or one or more applications 127. The various hardware memory units in memory 121 may include volatile and nonvolatile, removable and non-removable media implemented in any method or technology for storage of information such as computer-readable instructions, data structures, program modules, or other data. Memory 121 may include one or more physical persistent memory devices and/or one or more non-persistent memory devices. Memory 121 may include, but is not limited to, random access memory (RAM) 113, read only memory (ROM) 115, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 111.

Network interface 117 may include one or more transceivers, digital signal processors, and/or additional circuitry and software for communicating via any network, wired or wireless, using any protocol as described herein. Network interface 117 may also include near field communication (NFC) capabilities, short-range wireless communication capabilities (e.g., Bluetooth®), wireless communication capabilities (e.g., Wi-Fi), or any combination thereof. In some embodiments, communication interface 117 may include a GPS receiver/antenna. The GPS receiver/antenna may be configured to receive one or more signals from one or more global positioning satellites to determine a geographic location of computing device 101. The geographic location provided by the GPS receiver/antenna may be used for navigation, tracking, and positioning applications. For the purposes of the augmented reality viewing device, the GPS receiver/antenna may be used to locate the augmented reality viewing device. In some embodiments, the GPS receiver/antenna may determine the location of the augmented reality viewing device relative to a user computing device.

Devices 105, 107, 109 may have similar or different architecture as described above with respect to computing device 101. It will appreciate that the functionality of computing device 101 (or device 105, 107, 109) herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
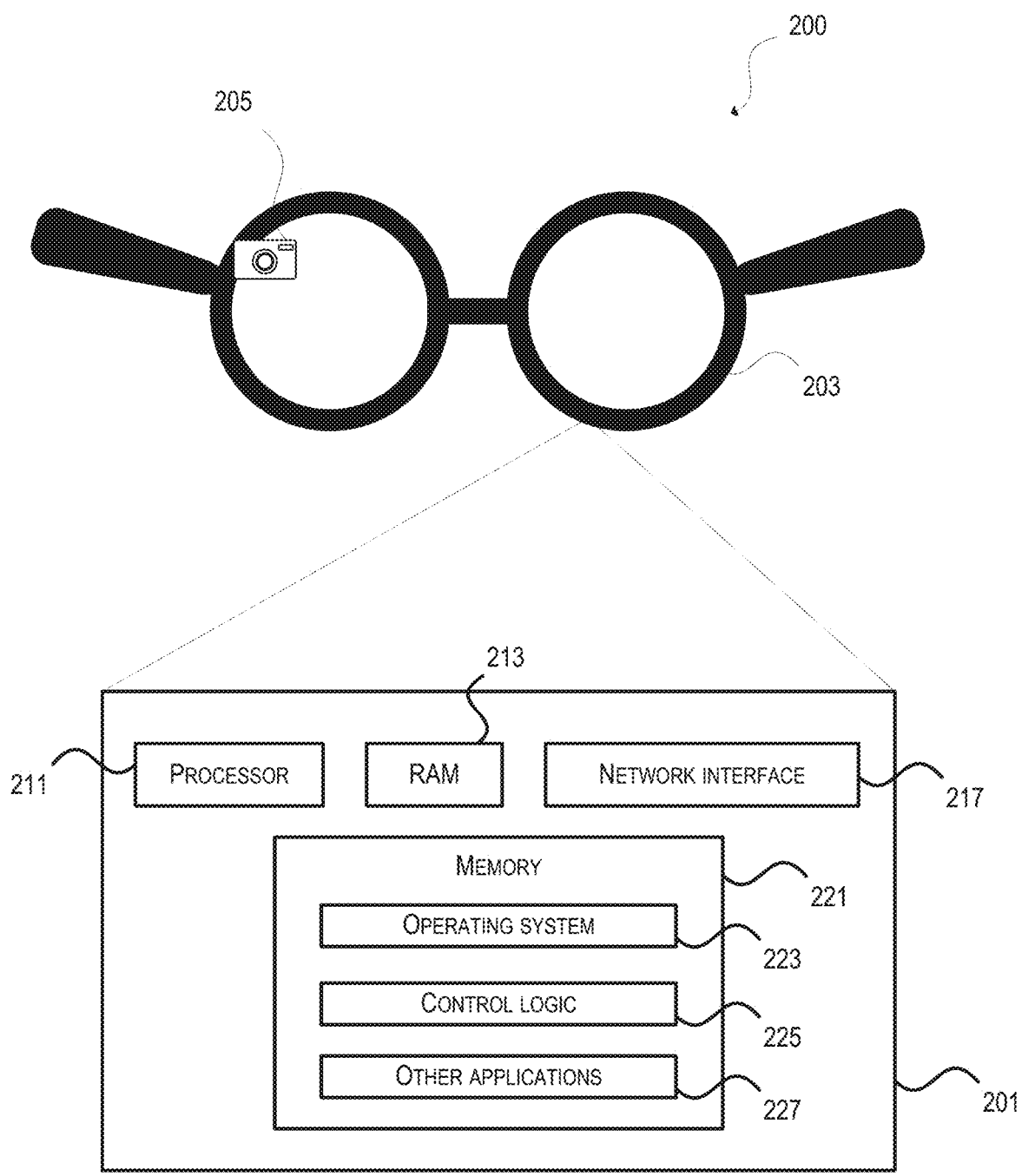
FIG. 2 shows an example of augmented reality viewing device that facilitates multifactor authentication according to one or more aspects of the disclosure.

As discussed above, some accounts, applications, services, and/or resources may provide for multifactor authentication with use of a one-time password. FIG. 2 illustrates an example of an augmented reality viewing device that facilitates multifactor authentication according to one or more aspects of the disclosure. Augmented reality viewing device 200 may be a wearable device, such as glasses 203. Instead of glasses, augmented reality viewing device 200 may include goggles, a visor, etc. Alternatively, augmented reality viewing device 200 may be a computing device, such as computing device 101. In some embodiments, augmented reality viewing device 200 may include a mobile device, tablet, laptop computer, or an equivalent thereof.

In addition to glasses 203, augmented reality viewing device 200 may include an image capture device 205 and computing logic 201. Additionally, augmented reality viewing device 200 may include a projector (not shown) to project an image on to the lenses of glasses 203 to provide an augmented view of reality. Alternatively, the lenses may be transparent display (e.g., a liquid crystal display (LCD)) that is configured to display images without obstructing the wearer's vision.

Image capture device 205 may be a camera, camera-array, video camera, or an equivalent thereof. In some embodiments, augmented reality viewing device 200 may include a plurality of image capture devices. For example, image capture devices may be located at the temples and/or the bridge of glasses frames. Alternatively, the augmented reality viewing device 200 may be a mobile device that includes a plurality of image capture devices. In some embodiments, image capture device 205 may be constantly recording.

Computing logic 201 may be similar to computing device 101 described above with respect to FIG. 1. In this regard, computing logic 201 may include a processor 211, RAM 213, network interface 217, and memory 221. The memory 221 may include an operating system 223, control logic 225, and/or other applications 227. Processor 211 may be any of the processors described above with respect to processor 111. Similarly, memory 221 may be any of the types of memory described above with respect to memory 121. Additionally, memory 221 may store software for configuring computing device 201 into a special purpose computing device in order to perform one or more of the various functions discussed herein. As discussed above, memory 221 may store operating system software 223 for controlling overall operation of augmented reality viewing device 200, control logic 225 for instructing augmented reality viewing device 200 to perform aspects discussed herein, and other applications 227. Applications 227 may include one or more applications that allow augmented reality viewing device 200 to perform the processes and algorithms described herein. For example, applications 227 may include an application that is configured to obtain a one-time password and provide the one-time password as part of a multifactor authentication process to provide the user with access to an account, application, resource, and/or service.

Much like processor 211 and memory 221, network interface 217 may be similar to network interface 117. In this regard, network interface 217 may include one or more transceivers, digital signal processors, and/or additional circuitry and software for communicating via any network, wired or wireless, using any protocol as described herein. Network interface 217 may also include near field communication (NFC) capabilities, short-range wireless communication capabilities (e.g., Bluetooth®), wireless communication capabilities (e.g., Wi-Fi), or any combination thereof.

Although not shown, augmented reality viewing device 200 may include a plurality of input/output devices. In addition to image capture device 205, augmented reality viewing device 200 may include an additional image capture device that is configured to obtain one or more biometric samples from a user for authentication purposes. Additionally, augmented reality viewing device 200 may include a speaker and microphone. In some embodiments, augmented reality viewing device 200 may be controlled via voice commands received via the microphone. Additionally, augmented reality viewing device 200 may provide aural feedback as part of the augmented reality display. In further embodiments, the speaker may be used for authentication purposes. For example, the speaker may receive a spoken password, passphrase, and/or passcode to verify the identity of a user, for example, by authenticating the user's voiceprint.

Figure 3A:
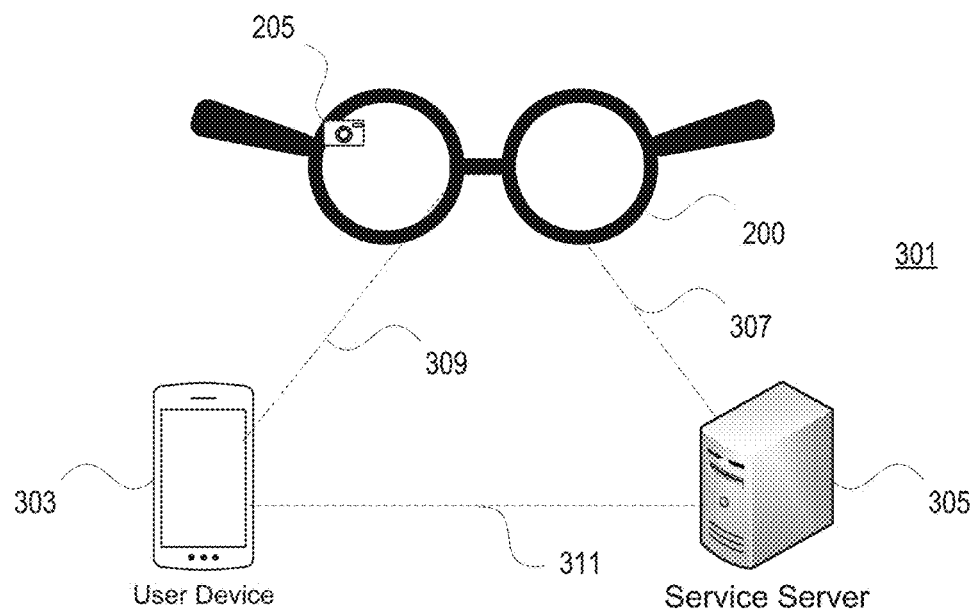
FIGS. 3A and 3B show examples of systems that perform part of a multifactor authentication process using an augmented reality viewing device according to one or more aspects of the disclosure.
Figure 3B:
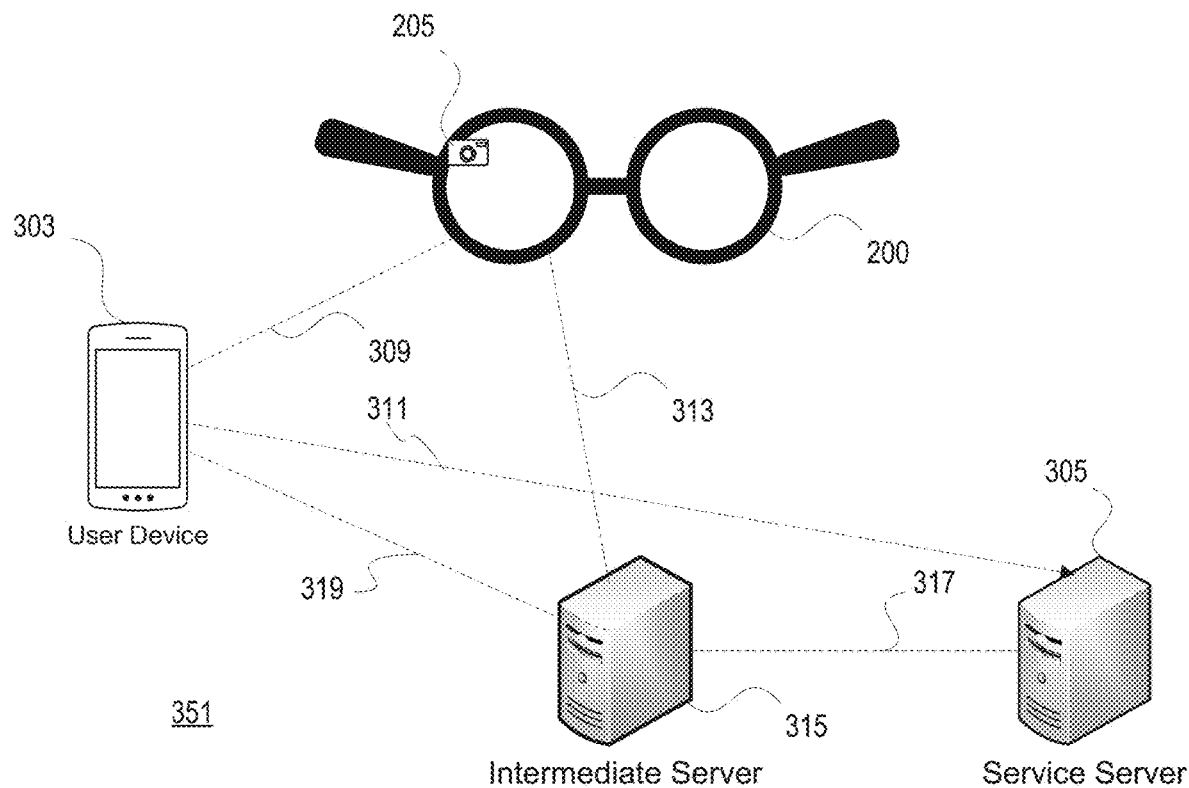

As part of a more efficient and secure multifactor authentication technique, an augmented reality viewing device may obtain a one-time password from a first device and provide the one-time password to a second device as part of the multifactor authentication process. For example, a user may wish to access an account, application, resource, and/or service on a computing device for which multifactor authorization is required. The one-time password may be sent to the computing device and/or another device associated with the user (e.g., a mobile device), for example, based on or in response to the user providing verified authentication data (e.g., a username and/or password, a PIN number, biometric data, etc.). The augmented reality viewing device may recognize the one-time password and determine if the request for the one-time password originated from the computing device. If the augmented reality viewing device verifies that the request for the one-time password originated from the computing device based on a context of a display of the computing device and/or the geographic locations of the computing device and the augmented reality viewing device, then the augmented reality viewing device may provide the one-time password to the account, application, resource, and/or service to complete the multifactor authentication process. FIG. 3A and FIG. 3B depict examples of systems that perform part of a multifactor authentication process using an augmented reality viewing device.

FIG. 3A illustrates an example of system 301, where an augmented reality viewing device plays a role in a multifactor authentication process. System 301 may include may include augmented reality viewing device 200, user device 303, and service server 305. Augmented reality viewing device 200, user device 303, and/or service server 305 may be communicatively coupled via one or more communication links (e.g., 307, 309, 311). The communication links 307, 309, 311 may be any suitable communication link, such as a wired and/or wireless links. In some embodiments, communication links 307, 309, and 311 may be internet connections.

Augmented reality viewing device 200 was discussed above with respect to FIG. 2. Augmented reality viewing device 200 may include an image capture device 205. The image capture device 205 may be configured to capture video and/or images of what the user views. The user may view a display of user device 303.

User device 303 may include any type of computing device, including a mobile device, a smart phone, a desktop computer, a laptop computer, a tablet computer, or any other kind of computing or data processing device. User device 303 may include one or more components of computing device 101, discussed above with respect to FIG. 1. Additionally, user device 303 may execute one or more applications, such as productivity applications, email applications, messaging applications, a virtual private network (VPN) application, etc. One or more of the applications (e.g., an email application) may require the user to perform multifactor authentication before granting the user access to the application.

Service server 305 may be a server configured to provide a user of user device 303 with access to one or more of an account, application, service, and/or resource. In this regard, service server 305 may include a database server, a directory service server, a computing server, an application server, a web server, an email server, or any other kind of remote server that processes data. For instance, service server 305 may be a directory service server, which manages a plurality of user accounts on behalf of an organization. If a user wishes to access a resource or application of the resource, the directory service server may authenticate the requesting user prior to granting permission to access the resource. The directory service server may require the user perform multifactor authentication prior to granting access to the requesting user.

In operation, user device 303 may attempt to access one or more of an account, an application, a service, and/or a resource provided by service server 305 via network link 311. For example, the user may be accessing an account, an application, a service, and/or a resource on user device 303 that communicates, interacts, or works with a counterpart application, service, or resource on service server 305. In some embodiments, user device 303 may transmit (e.g., send) a request to access an account, an application, a service, and/or a resource provided by service server 305. The request to access the account, application, service, and/or resource may include a first component of a multi-factor authentication process, such as a username and password, biometric identifier, and/or any suitable authentication technique. In response to the request to access the account, application, service, and/or resource, the user device 303 may receive a one-time password. The one-time password may be another component of the multifactor authentication process. In some embodiments, the one-time password may be received from service server 305. Alternatively, the one-time password may be received from a third-party server (not shown), such as an authentication server, or an application (e.g., Google Authenticator). The user device 303 may receive the one-time password via text message, push notification, email, or any other suitable means. The one-time password may be displayed on user device 303. As noted above, the one-time password may be a one-time code, a one-time passphrase, a temporary password, a passcode, a passphrase, a PIN, and/or any suitable information that may be used as part of a multifactor authentication process. In some embodiments, the one-time password may comprise a pseudorandom series of letters, numbers, or special characters. Additionally, or alternatively, the one-time password may comprise a window that prompts a user to approve the authentication attempt.

After receiving the one-time password, user device 303 may display the one-time password, for example, in a messaging or email application. In some embodiments, the user device 303 may display the one-time password in a pop-up notification. Augmented reality viewing device 200 may obtain a video, or image, of the display of the user device 303. The video or images may be obtained by image capture device 205 of augmented reality viewing device 200. The augmented reality viewing device 200 (e.g., image capture device 205) may regularly scan the display of user device 303 to detect one-time passwords. Augmented reality viewing device 200 may recognize a one-time password by a label (e.g., "one-time password") in a text message, push notification, and/or email. Additionally, and/or alternatively, the augmented reality viewing device 200 may detect a one-time password based on the number and/or length of characters. For example, the augmented reality viewing device 200 may detect a one-time password by matching the one-time password to known criteria and existing standards for one-time passwords. For instance, a one-time password may generally be a series of six characters (e.g., numbers, letters, punctuation, etc.), then the augmented reality viewing device 200 may recognize a series of six characters as a one-time password. The augmented reality viewing device 200 may store the obtained video, or images, in a memory for processing and/or analysis. The obtained video or images may include the received one-time password.

To process the obtained video or images, augmented reality viewing device 200 may analyze the obtained video or images to determine whether the obtained video or images contain the one-time password. Augmented reality viewing device 200 may analyze the video and/or images using image analysis techniques. For example, augmented reality viewing device 200 may use optical character recognition (OCR) to convert the video and/or images into usable data and strings of characters. Additionally, and/or alternatively, the augmented reality viewing device 200 may perform computations on the strings of characters to determine if a one-time password is present. The computations may include using a regular expression, natural language processing, or any kind of template matching protocol.

In some embodiments, the augmented reality viewing device 200 may confirm that a user initiated the request to access an account, application, service, and/or resource that prompted the one-time password. In one example, either augmented reality viewing device 200 and/or user device 303 may prompt the user for confirmation that they user is requesting access to the account, application, service, and/or resource. On the augmented reality viewing device 200, the prompt may be displayed on a lens (or both lenses) of the augmented reality viewing device 200. Additionally, and/or alternatively, the prompt may be audio of a voice asking the user to confirm that they requested access to the account, application, service, and/or resource. In some embodiments, the augmented reality viewing device 200 may automatically determine that the user initiated the request to access the account, application, service, and/or resource. For example, the augmented reality viewing device 200 may maintain a history of sites and applications that the user viewed, thereby allowing the augmented reality viewing device 200 to determine if the user requested access to an account, application, service, and/or resource associated with a site or application that the user viewed on the user device 303. In other embodiments, the augmented reality viewing device 200 may compare a geographic location of the user device requesting access to the account, application, service, and/or resource, and a geographic location of the augmented reality viewing device 200. For instance, the augmented reality viewing device 200 may receive the GPS coordinates of the user device that transmitted the request to access the account, application, service, and/or resource. The GPS coordinates may be obtained directly from the user device. Alternatively, the one-time password may include GPS coordinates of the device that made the request to access the account, application, service, and/or resource. If the GPS coordinates of user device 303 are not within a threshold distance of the GPS coordinates of the augmented reality viewing device 200, the augmented reality viewing device 200 may determine that the one-time password should not be used as part of a multifactor authentication process. However, when the GPS coordinates of user device 303 are within a threshold distance of the GPS coordinates of the augmented reality viewing device 200, the augmented reality viewing device 200 may determine that the one-time password may be used as part of a multifactor authentication process To use the one-time password as part of a multifactor authentication process, augmented reality viewing device 200 may send the one-time password to the user device 303, for example, via communication link 309. As discussed above, communication link 309 may be a near field communication (NFC), short-range wireless communication (e.g., Bluetooth®), wireless communication (e.g., Wi-Fi), or any combination thereof. User device 303 may receive the one-time password from the augmented reality viewing device 200. In some embodiments, the user device 303 may then transfer the one-time password to the account, application, service, and/or resource requesting the one-time password for access. In some instances, the user device 303 may use a separate application to handle the transfer of the one-time password to the account, application, service, and/or resource requesting the one-time password. Once the user device 303 has received the one-time password and provided the one-time password to the requesting account, application, service, and/or resource, the one-time password may be transmitted (e.g., sent) to be verified via communication link 311. In some embodiments, the one-time password may be transmitted to service server 305 and/or an appropriate authentication server. Upon receiving the one-time password, service server 305, or an equivalent authentication server, may compare the received one-time password to the previously generated one-time password. When the received one-time password does not match the previously generated one-time password, the service server 305 may deny access to the account, application, service, and/or resource. However, when the received one-time password matches the previously generated one-time password, service server 305 may grant access to the account, application, service, and/or resource. In further embodiments, service server 305, or an equivalent authentication server, may transmit a message, for example, via communication link 311, to user device 303 that indicates that access has been granted.

In an alternative embodiment, augmented reality viewing device 200 may send the one-time password directly to service server 305, or an equivalent authentication server, via communication link 307. That is, augmented reality viewing device may bypass user device 303 and send the one-time password directly to service server 305. Augmented reality viewing device 200 may store a plurality of IP addresses of accounts, applications, services, and/or resources that use multifactor authentication. In this regard, the augmented reality viewing device 200 may contact the authenticating servers directly. After receiving the one-time password, service server 305, or an equivalent authentication server, may compare the received one-time password to the previously generated one-time password. When the received one-time password does not match the previously generated one-time password, the service server 305 may deny access to the account, application, service, and/or resource. However, when the received one-time password matches the previously generated one-time password, service server 305 may grant access to the account, application, service, and/or resource. Service server 305, or an equivalent authentication server, may transmit a message, for example, via communication link 311, to user device 303 that indicates that access has been granted.

FIG. 3B illustrates another example of system 351, where an augmented reality viewing device plays a role in a multifactor authentication process. System 351 may include augmented reality viewing device 200, user device 303, intermediate server 315, and service server 305. Augmented reality viewing device 200, user device 303, intermediate server 315, and/or service server 305 may be communicatively coupled via one or more communication links (e.g., 309, 311, 313, 317, 319). The communication links 309, 311, 313, 317, and 319 may be any suitable communication link, such as a wired and/or wireless links. Augmented reality viewing device 200, user device 303, and service server 305 may be similar to the augmented reality viewing device, user device, and service server discussed above with respect to FIG. 3A. Intermediate server 315 may be configured to generate the one-time password, transmit the one-time password to user device 303, receive a one-time password for verification purposes, and/or verify the veracity of the received one-time password on behalf of, or in conjunction with, service server 305. In some embodiments, intermediate server 315 may be a third-party server, such as an authentication server (e.g., Google Authenticator).

As discussed above, user device 303 may attempt to access one or more of an account, an application, a service, and/or a resource provided by service server 305 via network link 311. In this regard, the user may be accessing an account, an application, a service, and/or a resource on user device 303 that communicates, interacts, or works with a counterpart application, service, or resource on service server 305. In some embodiments, user device 303 may transmit (e.g., send) a request to access an account, an application, a service, and/or a resource provided by service server 305 via communication link 311. The request to access the account, application, service, and/or a resource may include authentication information, such as a username and password.

In response to verifying the authentication information included in the request to access the account, application, service, and/or resource, service server 305 may contact intermediate server 315 via communication link 317. The service server 305 may request that intermediate server 315 generate a one-time password and transmit the one-time password to user device 303, on behalf of service server 305, via communication link 319. The request to generate a one-time password may be one factor in a multifactor authentication process. As discussed above, user device 303 may receive the one-time password via text message, push notification, email, or any other suitable means and displayed on user device 303. Augmented reality viewing device 200 may obtain a video, or image, of the display of the user device 303 and recognize a one-time password displayed on user device 303. The augmented reality viewing device 200 may store the obtained video, or images, in a memory for processing and/or analysis. The obtained video or images may include the received one-time password.

To process the obtained video or images, augmented reality viewing device 200 may analyze the obtained video or images to determine whether the obtained video or images contain the one-time password. In response to detecting a one-time password, the augmented reality viewing device 200 may confirm that a user initiated the request to access an account, application, service, and/or resource that prompted the one-time password. After confirming that the user initiated the request that prompted the one-time password, augmented reality viewing device 200 may send the one-time password to the user device 303, for example, via communication link 309. User device 303 may receive the one-time password from the augmented reality viewing device 200 and transfer the one-time password to the account, application, service, and/or resource requesting the one-time password for access. As discussed above, user device 303 may use a separate application to handle the transfer of the one-time password to the account, application, service, and/or resource requesting the one-time password. Next, user device 303 may transmit the one-time password to be verified, for example, as part of the multifactor authentication process. In some embodiments, the one-time password may be transmitted to intermediate server 315 via communication link 319. Alternatively, the one-time password may be transmitted to service server 305 via communication link 311, which, in turn, forwards the one-time password to intermediate server 315 via communication link 317. In some examples, the augmented reality viewing device 200 may transmit the one-time password directly to intermediate server 315, via communication link 313. That is, augmented reality viewing device 200 may bypass user device 303 to send the one-time password directly to intermediate server 315. Alternatively, the augmented reality viewing device 200 may transmit the one-time password to service server 305, which forwards the one-time password to intermediate server 315.

Upon receiving the one-time password, intermediate server 315 may compare the received one-time password to the previously generated one-time password, for example, as part of the multifactor authentication process. When the received one-time password does not match the previously generated one-time password, the intermediate server 315 may notify service server 305 that the multifactor authentication process failed. The service server 305 may deny user device 303's request to access the account, application, service, and/or resource. However, when the received one-time password matches the previously generated one-time password, intermediate server 315 may notify service server 305 that authentication was successful. Service server 305 may grant user device 303 access to the account, application, service, and/or resource. Additionally, or alternatively, another factor in the multifactor authentication process may be verified before granting access to the account, application, service, and/or resource.

Figure 4:
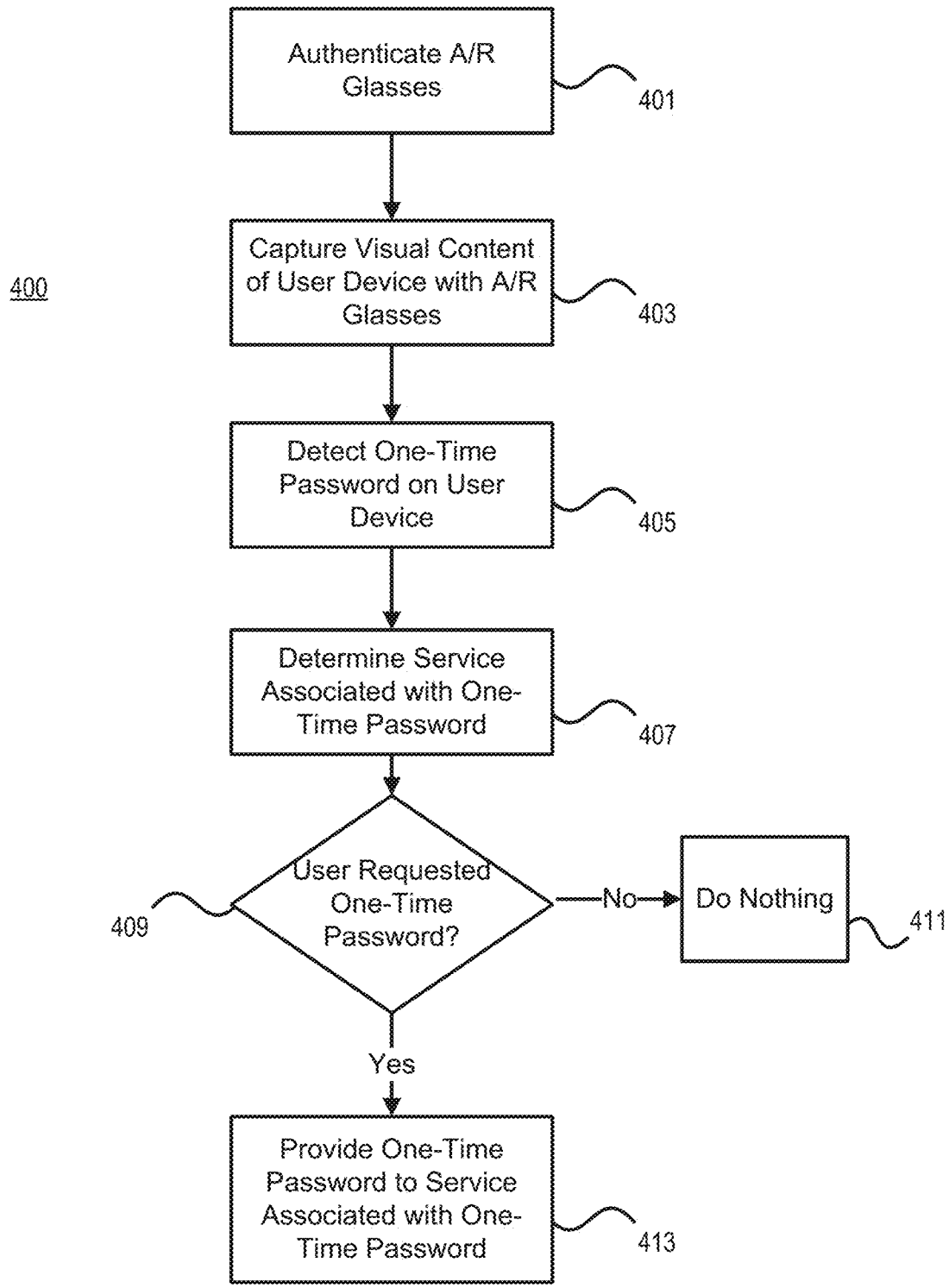
FIG. 4 depicts a flowchart of a process for using an augmented reality viewing device as part of a multifactor authentication process according to one or more aspects of the disclosure.

Augmented reality viewing devices may be used to facilitate the use of one-time passwords as part of a multifactor authentication process. FIG. 4 illustrates a flowchart of a process 400 for using an augmented reality viewing device as part of a multifactor authentication process according to one or more aspects of the disclosure. Some or all of the steps of process 400 may be performed using one or more computing devices, such as the augmented reality viewing device of FIG. 2, described herein.

Process 400 begins in step 401, with an augmented reality viewing device (e.g., augmented reality (A/R) glasses) authenticating a user. The augmented reality viewing device may authenticate the user using a variety of techniques including using biometric identifiers of the user. In this regard, the augmented reality viewing device may authenticate the user via facial recognition, iris scanning, voice recognition, fingerprint recognition, and/or any equivalent thereof. In some embodiments, the augmented reality viewing device may authenticate a plurality of biometric features of the user. After obtaining a biometric sample from a user, the augmented reality viewing device may compare the biometric sample to a registered biometric sample. When the biometric samples do not match, the user may not be authenticated. Accordingly, the user may not be authorized to access the augmented reality viewing device. The augmented reality viewing device may provide the unauthorized user with limited, or no, access to the functionality of the augmented reality viewing device. However, when the biometric samples match, the augmented reality viewing device may authenticate the user and provide the user with access to the functionality of the augmented reality viewing device.

After the user is authenticated, the augmented reality viewing device may capture (or begin to capture) visual content at step 403. The augmented reality viewing device may capture the visual content with one or more image capture devices. The visual content may be what the user sees, which may include the display of the user's computing device. Additionally, the visual content may include video or images. As discussed above, the augmented reality viewing device may store visual content in a memory, such as memory 221. In some embodiments, the augmented reality viewing device may store the captured visual content on a server. In further embodiments, the visual content may be stored in a memory of the augmented reality viewing device and the server. In some instances, the visual content may be analyzed to record the websites, apps, and/or other services that may require multifactor authentication.

At step 405, the augmented reality viewing device may detect a one-time password displayed on the computing device. The augmented reality viewing device may detect the one-time password as part of the augmented reality viewing device's routine image capturing. In some instances, the one-time password may be detected in response to an audible prompt. Alternatively, the augmented reality viewing device may detect the one-time password based on a prompt, such as recognizing a phrase, icon, window, etc. The one-time password may be detected using optical character recognition (OCR). OCR technology may include converting images captured by the camera 205 into machine-readable data. In some embodiments, the system may extract the one-time password from a superset of captured text using regular expression (regex) techniques. For example, the augmented reality viewing device may apply a regex matching rule against the captured text to identify matches. Additionally, the regex techniques may be configured to identify phrases, or other markers, identifiers, and/or signatures, that indicate that a message may include a one-time password. For example, regex may search for a name of a service associated with the one-time password. In another example, regex may look for a message to be from a phone number associated with the service. In yet a further example, regex may be configured to search for a sequence of characters matching known requirements for one-time passwords. In this regard, the augmented reality viewing device may be configured to search for and/or identify a 6-digit one-time passwords from a first provider, while a second provider may be known to send one-time passwords of 8 alphanumeric characters.

Instead of, or in addition to, using regex, the augmented reality viewing device may use natural language processing (NLP), or a similar process, to extract the one-time password from the recognized text. NLP may process and analyze human language in such a way that a computer can understand and use the text. For example, the computing device may receive a one-time password in a text message which may state that a one-time password is contained in the text message. The augmented reality viewing device may understand the text message using NLP. In this regard, the augmented reality viewing device may be programmed to recognize keywords and/or phrases, such as "verification code," "security code," "PIN," "password," etc. The augmented reality viewing device may use a variety of template matching techniques to search for and detect one-time passwords that appear on the display of the user's computing device.

As discussed above, the computing device may receive the one-time password as a result of the user attempting to log into an account, application, service, and/or resource that requires multifactor authentication. Once a one-time password has been detected, the augmented reality viewing device may determine the account, application, service, and/or resource associated with the one-time password in step 407. The augmented reality viewing device may determine the service by analyzing the visual content captured by the image capture device. For example, the augmented reality viewing device may capture a login attempt (e.g., a first step in a multifactor authentication process) and subsequently recognize the one-time password (e.g., an additional step in the multifactor authentication process) as being associated with the login attempt. The augmented reality viewing device may perform the computations to determine the account, application, service, and/or resource, for example, using computing logic 201. In some embodiments, the augmented reality viewing device may transmit the captured video or images to a remote server. The remote server may perform one or more of the computations to determine the account, application, service, and/or resource for which the one-time password may be applied. As discussed above, the computations may include a plurality of image and/or text analysis techniques, such as OCR and NLP, to detect the one-time password. In some embodiments, the augmented reality viewing device may search for text or images that may identify the account, application, service, and/or resource associated with the one-time password. According to one example, a text message may indicate a one-time password and the name of the account, application, service, and/or resource associated with the one-time password. The augmented reality viewing device may locate and identify the account, application, service, and/or resource based on the name of the account, application, service, and/or resource identified in the text message.

In alternative embodiments, the one-time password may be received via a push notification or email. The augmented reality viewing device may determine the account, application, service, and/or resource by recognizing the name of the account, application, service, and/or resource in the push notification and/or email. Additionally, or alternatively, the augmented reality viewing device may recognize a phone number that sent the text message and/or push notification containing the one-time password. In this regard, the augmented reality viewing device and/or the remote server may store a database of phone numbers that are commonly used to provide a one-time password as part of a multifactor authentication process. Accordingly, the augmented reality viewing device and/or the remove server may query the database with the received phone number to determine to an account, application, service, and/or resource associated with the one-time password. Additionally, and/or alternatively, the augmented reality viewing device may recognize an email address that provided the one-time password. Similar to the discussion of phone numbers above, the augmented reality viewing device may query a database using the email address to determine an account, application, service, and/or resource associated with the one-time password. In further embodiments, the augmented reality viewing device may use websites, applications, and/or phone numbers that the user viewed to determine the account, application, service, and/or resource associated with the one-time password. Additionally, or alternatively, the augmented reality viewing device may determine the account, application, service and/or resource associated with the one-time password based on a context of a display of the user's computing device. The context may include a phone number, application name, website address, website, URL, and/or any other types of identifying information that would assist the augmented reality viewing device in determining which account, application, service, and/or resource is associated with the one-time password.

In some embodiments, an application on the user's computing device may monitor which account, application, service, and/or resource requested the one-time password. For example, the application may track which websites the user has visited. Additionally, or alternatively, the application may determine the duration of the visit and whether the user made any login in attempts during his/her visit to the website. In this regard, login attempts may be used to determine the account, application, service, and/or resource associated with the one-time password. Additionally, or alternatively, the application may scan the display of the user's computing device, for example, at fixed intervals. The application may then analyze the screen to identify accounts, applications, services, resources, and/or websites that the user visited. Additionally, the application may identify login attempts. The augmented reality viewing device may detect a one-time password and send an indication (e.g., notification) to the user's computing device (e.g., the application executing on the user's computing device) that a one-time password has been detected. The user's computing device (e.g., the application executing on the user's computing device) may then report back to the augmented reality viewing device which accounts, applications, services, resources, and/or websites that the user has recently accessed. In some embodiments, the computing device may track which accounts, applications, services, resources, and/or websites have requested a one-time password and may communicate that information to the augmented reality viewing device. The augmented reality viewing device may confirm that the one-time password is valid and authentic and provide the one-time password to the associated account, application, service, resource, and/or website. The application may also indicate that it is a valid request.

At step 409, the augmented reality viewing device may confirm that the user requested the one-time password. For example, the augmented reality viewing device may provide a prompt to the user asking the user to confirm whether they requested a one-time password. In some embodiments, the user may confirm that the one-time password request is valid by verbally confirming. In other embodiments, the user may confirm that the one-time password is valid by a non-verbal acknowledgment, such as nodding or shaking their head. If the user did not request the one-time password, the one-time password may not be transmitted (e.g., sent) to the user computing device or to a server in step 411. In some embodiments, the augmented reality viewing device may transmit (e.g., send) a notification to the user's computing device that the one-time password was not a valid request. In some instances, the augmented reality device may not transmit the one-time password to the service server for authentication purposes. Additionally, the user's computing device may notify the user that the password was not sent. In some embodiments, the augmented reality viewing device may send a notification to the user's computing device to notify the user that an attempt to log into an account, application, service, resource, and/or website was blocked.

If the user confirms that the one-time password was a valid request, then the augmented reality viewing device may transmit (e.g. send) the one-time password to the account, application, service, resource, and/or website associated with the one-time password in step 413. In some embodiments, the one-time password may be sent to the user's computing device through a wireless communication link, such as Bluetooth®. The user device may then send the one-time password to a server to verify (e.g. authenticate) the one-time password. In alternative embodiments, the augmented reality viewing device may transmit (e.g., send) the one-time password to the server. In yet another embodiment, the augmented reality viewing device may transmit (e.g., send) the one-time password and other relevant data, including the visual content, to the intermediate server for verification.

Figure 5:
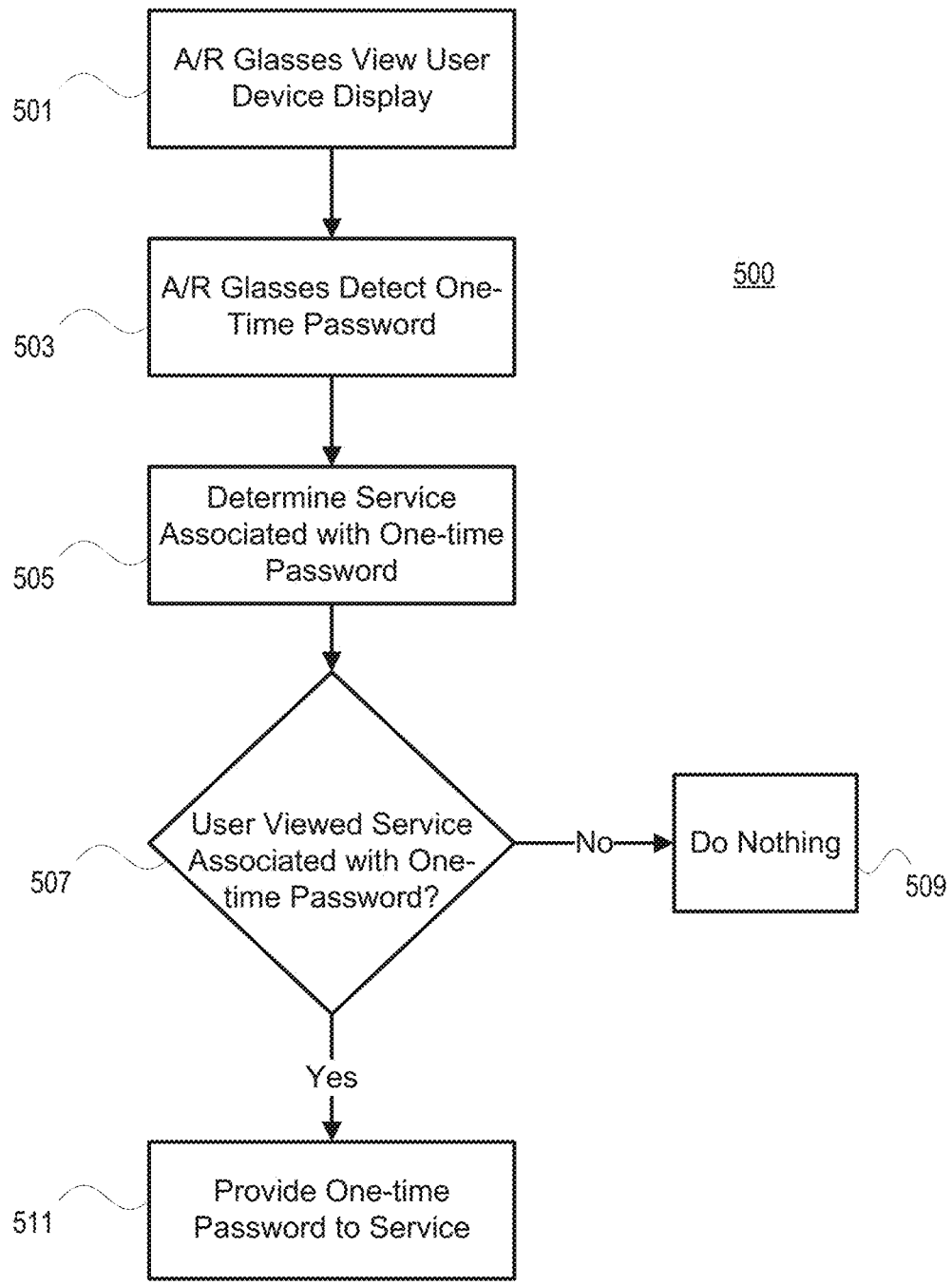
FIG. 5 depicts a flowchart of a process for confirming that a user is attempting to access an account and/or service according to one or more aspects of the disclosure.

As discussed above, the augmented reality viewing device may determine which account, application, service, resource, or website that prompted (e.g., generated) the one-time password. In this regard, the augmented reality device may determine which account, application, service, resource, or website and confirm that that the user is attempting to access the account, application, service, resource, and/or website. FIG. 5 illustrates a flowchart of a process 500 for confirming that a user is attempting to access an account, application, service, resource, and/or website associated with a received one-time password. Some or all of the steps of process 500 may be performed using one or more computing devices, such as the augmented reality viewing device of FIG. 2, described herein.

At step 501, the augmented reality viewing device may capture video and/or images of the display of the user's computing device. The augmented reality viewing device may analyze the captured video and/or images to identify accounts, applications, services, resources, and/or websites. The augmented reality viewing device may record the different accounts, applications, services, resources, and/or websites visited and/or accessed by the user. As discussed above, the augmented reality viewing device may determine the actions of the user, as well as the context of the display. In some embodiments, machine learning and/or artificial intelligence may be used to determine the actions of the user, as well as identify and classify objects on the display. In some instances, the augmented reality viewing device may determine that the user is attempting to gain access (e.g., login) to an account, application, service, resource, and/or website. Based on a determination that the user is attempting to gain access (e.g., login) to an account, application, service, resource, and/or website, the augmented reality viewing device may begin monitoring for a one-time password.

At step 503, the augmented reality viewing device may detect a one-time password on the computing device's display. As noted above, augmented reality viewing device may detect the one-time password using image analysis techniques. For example, the augmented reality viewing device may use regex, NLP, OCR, and/or similar text and/or image analysis protocols to recognize and parse keywords and/or phrases displayed on the computing device. Additionally, or alternatively, the augmented reality viewing device may use template matching to recognize and identify one-time passwords. In some embodiments, the augmented reality viewing device may recognize a one-time password using character matching techniques described above.

After detecting a one-time password, the augmented reality viewing device may determine the account, application, service, resource, and/or website associated with the one-time password in step 505. As discussed above, the augmented reality viewing device may record which accounts, applications, services, resources, and/or websites that the user may visit and/or access. In some embodiments, the augmented reality viewing device may recognize when the user attempts to login to an account, application, service, resource, and/or website. In some examples, the login may include authentication information (e.g., username and password, biometric identifier, etc.) as a first part of a multifactor authentication process. Alternatively, the augmented reality viewing device may recognize when an account, application, service, resource, and/or website prompts a user for login information, for example, as part of a multifactor authentication process. In some embodiments, the augmented reality viewing device may determine the account, application, service, resource, and/or website associated with the one-time password based on information included with the one-time password. For example, the information may include a phone number, email address, or other sender identifier that would allow the augmented reality device to determine with which the account, application, service, resource, and/or website to associate the one-time password.

In other examples, the one-time password may include an identifier that indicates the account, application, service, resource, and/or website with which to associate the one-time password.

At step 507, the augmented reality viewing device may compare recently viewed and/or accessed accounts, applications, services, resources and/or websites with the account, application, service, resource, and/or website associated with the one-time password. If the one-time password does not match an account, application, service, resource, and/or website that the user recently viewed, accessed, and/or attempted to login to, the augmented reality viewing device may determine that the one-time password was received in error. Alternatively, the augmented reality viewing device may determine that the one-time password is fraudulent. Accordingly, the augmented reality viewing device does not provide the one-time password to the computing device in step 509. In some embodiments, the augmented reality viewing device may send a notification to the computing device that the one-time password was not valid. The augmented reality viewing device may also indicate that the one-time password was not sent to an authentication server. In additional embodiments, the augmented reality viewing device may send a notification to the computing device to indicate that a login attempt was blocked.

If the one-time password matches an account, application, service, resource, and/or website that the user recently viewed, accessed, and/or attempted to login to, the augmented reality device may determine that the one-time password is associated with the account, application, service, resource, and/or website that the user recently viewed, accessed, and/or attempted to log into in step 507. The augmented reality viewing device may determine that the one-time password was received in response to a valid request by the user to access or log into an account, application, service, resource, and/or website. Based on the determination that the one-time password is associated with an attempt to access or log into an account, application, service, resource, and/or website, the augmented reality viewing device may provide the computing device with the received one-time password in step 511. As discussed above, providing the one-time password may include providing the one-time password to the computing device (e.g., the one-time password field in a login screen). Alternatively, the one-time password may be provided to an application residing on the computing device. The application may then provide the one-time password as part of the multifactor authentication process. By having the augmented reality device supply the one-time password to the computing device, the user may not take any additional action to confirm that the one-time password was requested by the user. Accordingly, the algorithm described above in FIG. 5 provides a more efficient and secure technique for providing one-time passwords as part of a multifactor authentication process.

Figure 6:
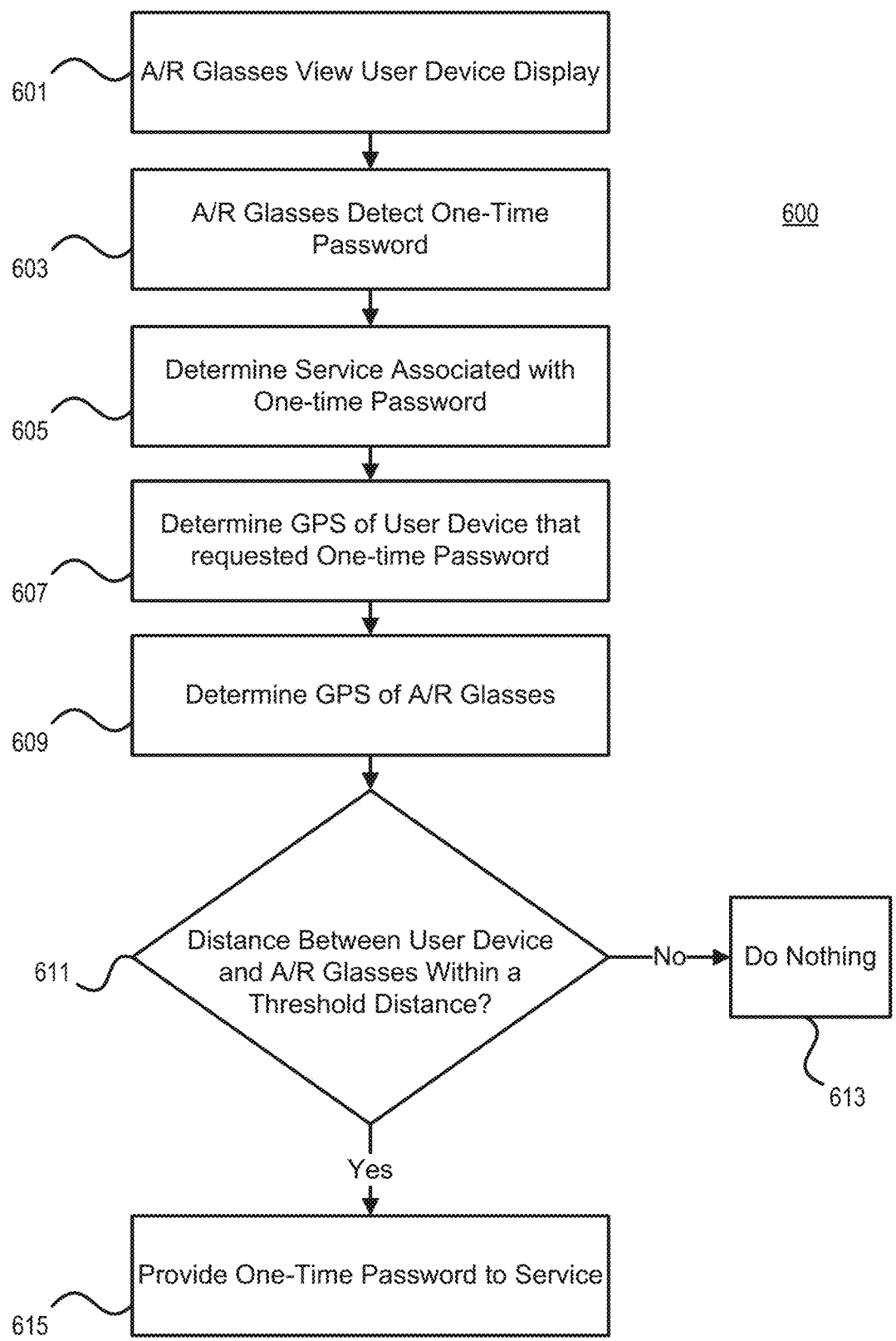
FIG. 6 depicts a flowchart of a process for verifying the authenticity of a request for a one-time password according to one or more aspects of the disclosure.

As an additional layer of security, the augmented reality viewing device may verify that the augmented reality viewing device and the computing device are proximately located. FIG. 6 illustrates a flowchart of a process 600 for verifying the authenticity of the request for the one-time password according to one or more aspects of the disclosure. Some or all of the steps of process 600 may be performed using one or more computing devices, such as the augmented reality viewing device of FIG. 2, described herein.

In step 601, the augmented reality viewing device may capture video and/or images of the display of the user's computing device. The augmented reality viewing device may analyze the captured video and/or images to identify accounts, applications, services, resources, and/or websites. The augmented reality viewing device may record the different accounts, applications, services, resources, and/or websites visited and/or accessed by the user. Based on a determination that the user is attempting to gain access to an account, application, service, resource, and/or website, the augmented reality viewing device may begin monitoring for a one-time password.

At step 603, the augmented reality glasses may detect a one-time password on the computing device's display using the techniques described above. In step 605, the augmented reality viewing device may determine the account, application, service, resource, and/or website associated with the one-time password. As noted above, this may involve a variety of techniques and information. At step 607, the augmented reality viewing device may determine the location of the computing device requesting access to the account, application, service, resource, and/or website. As noted above, determining the location of the computing device may include determining the computing device's coordinates using a geo-location service, such as a global positioning system (GPS). In some embodiments, the augmented reality viewing device may request the location of the computing device from the computing device. The request may be made to the computing device from which the request to access the account, application, service, resource, and/or website has been made. In response to the request, the computing device may send its location (e.g., GPS coordinate location) to the augmented reality viewing device. Additionally, or alternatively, the computing device may transmit its location to an authentication server (e.g., service server 305, intermediate server 315), which may store the computing device's location. In these cases, the augmented reality viewing device may query the authentication server (e.g., service server 305, intermediate server 315) to determine the location of the computing device that initiated the request to access. The authentication server may send the location of the computing device to the augmented reality viewing device in response to a request to determine the location of the computing device. Additionally, or alternatively, the authentication server may provide the location of the computing device to the intermediate server 315, for example, when the intermediate server 315 performs the authentication functions on behalf of the service server 305.

At step 609, the augmented reality viewing device may determine its location. In these examples, the augmented reality viewing device may use a geolocation service, such as GPS, to determine its coordinates. The location of the augmented reality viewing device may be determined and stored in memory. The augmented reality viewing device may obtain the most recent location from memory, for example, in response to detecting receipt of a one-time password.

At step 611, the augmented reality device may compare the location of the computing device with the location of the augmented reality viewing device. In some examples, a threshold may be set. For example, if the computing device and the augmented reality viewing device are greater than a predetermined distance apart, the augmented reality viewing device may determine that the one-time password request is fraudulent or an error. The augmented reality viewing device may not send the one-time password to the computing device in step 613. In some instances, the augmented reality viewing device may indicate to the computing device that the one-time password was an invalid request. Additionally, or alternatively, the computing device may indicate that the one-time password was not transmitted to the authentication server. In some embodiments, the augmented reality viewing device may also send a notification to the computing device that an attempt to log into an account, application, service, resource, and/or website was blocked.

If the computing device and the augmented reality viewing device are less than or equal to a predetermined distance apart, the augmented reality viewing device may determine that the received one-time password is for a valid request to access and/or log into an account, application, service, resource, and/or website. The augmented reality viewing device may provide the one-time password to the computing device in step 615. In some examples, the augmented reality viewing device may provide the one-time password directly to the account, application, service, resource, and/or website (e.g., the login interface associated therewith). Alternatively, or additionally, the augmented reality viewing device may provide the one-time password to an application running on the computing device. The application, in turn, may use the one-time password to complete the multifactor authentication process to access the account, application, service, resource, and/or website. By verifying the proximity of the augmented reality viewing device and the computing device is within a predetermined threshold, the augmented reality viewing device may confirm that the received one-time password is for a valid request to access an account, application, service, resource, and/or website. Accordingly, the algorithm described above in FIG. 6 provides an additional layer of security when performing a multifactor authentication process.

It will be appreciated that the methods, algorithms, and processes described above may be performed or combined in a variety of ways to determine the authenticity of a request for a one-time password. These combinations may result in a faster and easier access to accounts, applications, services, resources, and/or websites without sacrificing security. Additionally, security may be improved by bridging user devices to verify ownership of one user device by viewing a one-time password that was sent to another user device that the user owns. Furthermore, the overall security of entering one-time passwords may be improved. If a one-time password can be entered automatically, instead of manually, then one-time passwords can be much longer and therefore may be more secure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   authenticating, by an augmented reality viewing device, a user by a first authentication process;
   capturing, by the augmented reality viewing device, first visual content displayed by a user device;
   detecting, by the augmented reality viewing device, a one-time password based on the first visual content, wherein the one-time password is associated with a multifactor authentication process to access a service;
   determining, by the augmented reality viewing device, the service associated with the one-time password based on visual context included in the first visual content;
   determining a first geographic location of the augmented reality viewing device;

determining a second geographic location of the user device;

verifying, based on a determination that the augmented reality viewing device and the user device are proximately located to each other based on the first geographic location and the second geographic location being within a threshold distance of each other, that the user initiated access to the service; and providing, based on authentication of the user by the first authentication process and based on verification that the user initiated the request to access the service, the one-time password to the service as part of the multifactor authentication process.

2. The method of claim 1, wherein confirming that the user initiated access to the service comprises:

generating a prompt requesting that the user confirm that the one-time password should be provided to the service, and receiving the requested confirmation from the user.

3. The method of claim 1, wherein confirming that the user initiated access to the service comprises:

determining that the user viewed the service based on the first visual content.

4. The method of claim 1, wherein confirming that the user initiated access to the service comprises:

capturing, by the augmented reality viewing device, second visual content displayed by the user device at a second time different from a first time at which the first visual content was captured; and determining that the user viewed the service based on the second visual content.

5. The method of claim 1, wherein providing the one-time password to the service comprises sending, by the augmented reality viewing device, the one-time password to the user device.

6. The method of claim 1, wherein providing the one-time password to the service comprises sending, by the augmented reality viewing device and bypassing the user device, the one-time password to the service.

7. The method of claim 1, wherein determining the service associated with the one-time password is further based on:

capturing, by the augmented reality viewing device, second visual content displayed by the user device; and identifying, by the augmented reality viewing device, a website based on the second visual content.

8. The method of claim 1, wherein determining the service associated with the one-time password is further based on:

capturing, by the augmented reality viewing device, second visual content displayed by the user device; and identifying, by the augmented reality viewing device, a phone number based on the second visual content.

9. The method of claim 1, wherein determining the service associated with the one-time password is further based on information received via wireless communications from an application on the user device associated with the service.

10. The method of claim 1, wherein detecting the one-time password comprises recognizing text using optical character recognition.

11. The method of claim 10, wherein detecting the one-time password further comprises parsing the recognized text using regular expression.

12. The method of claim 10, wherein detecting the one-time password further comprises parsing the recognized text using natural language processing.

13. The method of claim 1, wherein the visual context comprises at least one a text message that the user received on the user device, a push notification containing the one-time password, a phone number, or a website address.

14. An augmented reality viewing device comprising:

a camera configured to capture visual content;

one or more processors; and memory storing instructions that, when executed by the one or more processors, cause the augmented reality viewing device to:

authenticate a user by a first authentication process;

capture first visual content displayed by a user device;

detect a one-time password based on the first visual content, wherein the one-time password is associated with a multifactor authentication process to access a service;

determine the service associated with the one-time password based on visual context included in the first visual content;

determining a first geographic location of the augmented reality viewing device;

determining a second geographic location of the user device;

verify, based on a determination that the augmented reality viewing device and the user device are proximately located to each other based on the first geographic location and the second geographic location being within a threshold distance of each other, that the user initiated access to the service; and provide, based on the authentication of the user by the first authentication process and based on verification that the user initiated the request to access the service, the one-time password to the service as part of the multifactor authentication process.

15. The augmented reality viewing device of claim 14, wherein the stored instructions, when executed by the one or more processors, further cause the augmented reality viewing device to:

provide to the service a username associated with the user.

16. The augmented reality viewing device of claim 14, wherein the stored instructions, when executed by the one or more processors, further cause the augmented reality viewing device to:

provide, to the service, information indicating that the user was authenticated by the first authentication process.

17. The augmented reality viewing device of claim 14, wherein confirming that the user initiated access to the service comprises determining that the user viewed the service based on the first visual content or based on a second visual content.

18. One or more non-transitory media storing instructions that, when executed by one or more processors, cause an augmented reality viewing device to perform steps comprising:

authenticating a user by a first authentication process;

capturing first visual content displayed by a user device;

detecting a one-time password based on the first visual content, wherein the one-time password is associated with a multifactor authentication process to access a service;

determining, the service associated with the one-time password based on visual context included in the first visual content;

confirming that the user initiated the request to access the service, wherein confirming that the user initiated the request to access the service comprises:

capturing, by the augmented reality viewing device, second visual content displayed by the user device at a second time different from a first time at which the first visual content was captured;

determining that the user viewed the service based on the second visual content;

determining a first geographic location of the augmented reality viewing device;

determining a second geographic location of the user device; and verifying, based on a determination that the user viewed the service based on the second visual content and based on the augmented reality viewing device and the user device are proximately located to each other based on the first geographic location and the second geographic location being within a threshold distance of each other, that the user initiated access to the service;

providing the one-time password and additional information to the service as part of the multifactor authentication process.

19. The method of claim 1, comprising:

detecting, by the augmented reality viewing device, a second one-time password;

determining, by the augmented reality viewing device, a second service associated with the second one-time password based on a second visual context of a second visual content;

determining a third geographic location of the augmented reality viewing device;

determining a fourth geographic location of the user device;

determining that the user did not initiate the request to access the service based on a distance between the third geographic location and the fourth geographic location being greater than the threshold distance; and stopping second multifactor authentication process by withholding the second one-time password from the second service.

* * * * *